A. N. AUDET.
TIRE AND RIM CARRIER.
APPLICATION FILED FEB. 21, 1921.
1,412,645. Patented Apr. 11, 1922.
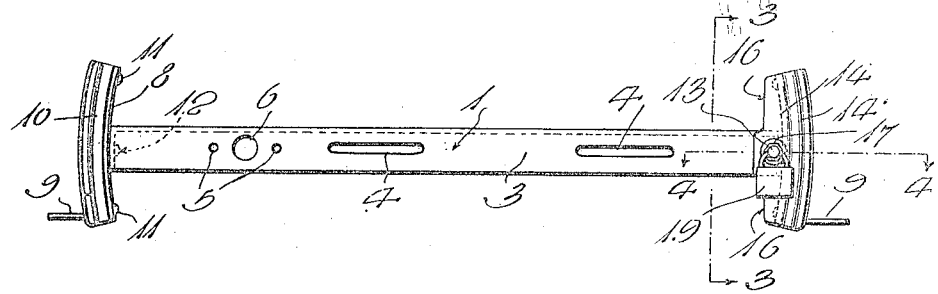
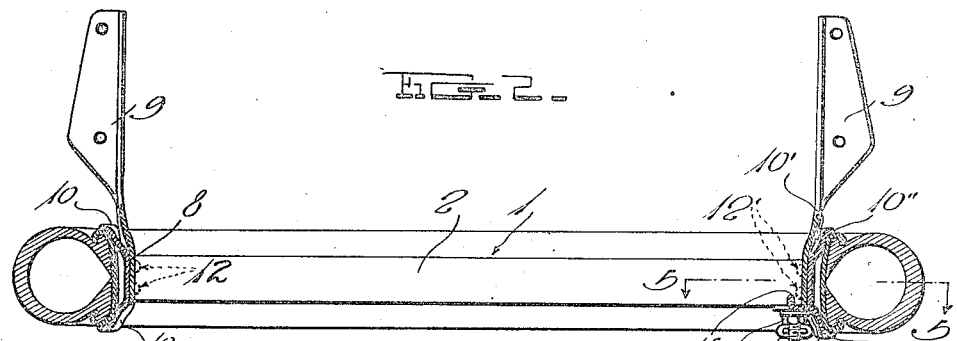
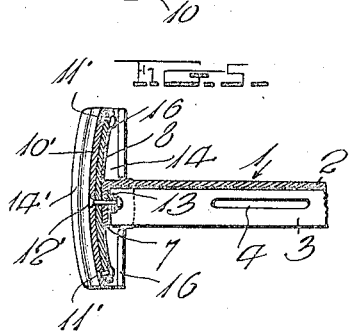 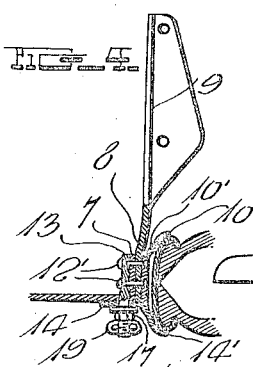 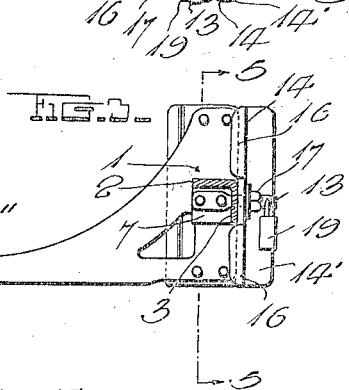
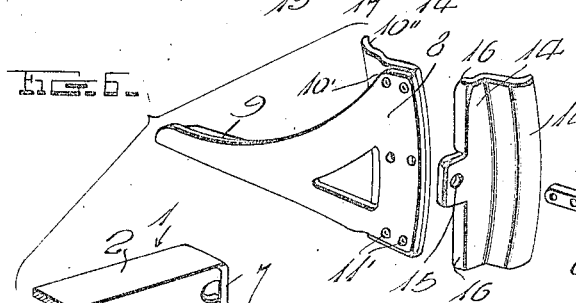
Witness
H. Woodard
Inventor
A. N. Audet
By H. R. Wilson & Co.
Attorneys

UNITED STATES PATENT OFFICE.

ADJUTOR N. AUDET, OF WILLIAMSPORT, PENNSYLVANIA.

TIRE AND RIM CARRIER.

1,412,645.

Specification of Letters Patent. Patented Apr. 11, 1922.

Application filed February 21, 1921. Serial No. 446,733.

*To all whom it may concern:*

Be it known that I, ADJUTOR N. AUDET, a citizen of the United States, residing at Williamsport, in the county of Lycoming and State of Pennsylvania, have invented certain new and useful Improvements in Tire and Rim Carriers; and I do declare the following to be a full, clear, and exact description of the invention, such as will enable others skilled in the art to which it appertains to make and use the same.

My invention relates to improvements in spare tire and rim carriers for automobiles and the principal object is to provide an extremely simple and inexpensive, yet a highly efficient and reliable device which may be constructed almost entirely of stamped metal, novel provision however being made whereby this metal is effectively reinforced and therefore prevented from bending.

A further object is to provide a device of the class described in which a pair of channel-shaped rim seats carried by opposite ends of a rigid bar, are vertically elongated to such an extent as to prevent any possible canting and rattling of the rim, novel provision being made whereby after being seated within one of the rim seats which is of one-piece formation, the rim is forced onto the other seat and clamped thereon in a tight manner.

With the foregoing in view, the invention resides in the novel construction and combination of parts hereinafter described and claimed, the descriptive matter being supplemented by the accompanying drawings.

Figure 1 is a rear elevation of a rim and tire carrier constructed in accordance with my invention.

Figure 2 is a top plan view partly in horizontal section showing a rim and tire applied to the carrier.

Figures 3 and 4 are respectively vertical and horizontal sectional views as indicated by lines 3—3 and 4—4 of Fig. 1.

Figure 5 is a detail vertical sectional view on line 5—5 of Fig. 2.

Figure 6 is a disassembled perspective view of the parts at one end of the carrier.

In the drawings above briefly described, the numeral 1 designates an angle iron bar having a horizontal flange 2 and a vertical flange 3, the latter being provided with slots 4 for the attachment of a license tag, with rivet holes 5 for the attachment of a tail-light, and with an opening 6 through which the electrical connections pass to the light. The horizontal flange 2 is bent vertically downward at its ends as seen at 7 and the widened rear ends 8 of a pair of appropriate attaching brackets 9 contact at their intermediate portions with the flange ends 7; said ends 8 extending above and below the bar 1 and being curved about a point at the center and contacting with the outer sides of said bar. Contacting with the outer sides of the curved end 8 of one of the bracket arms 9, is a one-piece, vertically elongated channel-shaped plate 10 which is co-extensive in height with said end 8 and is riveted at its upper and lower ends thereto as shown at 11. Other rivets 12 pass through the plate 10, the adjacent bracket end 8, and the downturned flange ends 7 to rigidly secure all of these parts together.

At the end of the bar 1 remote from the channel-shaped plate 10, the widened end 8 of the other bracket arm 9 contacts with the outer side of the bent flange end 7, and a substantially semi-channel-shaped plate 10' contacts with the outer side of said end 8 and is co-extensive in height therewith. The flattened inner end of a bolt 13 contacts with the flange end 7 and passes through an opening 13' in the flange 3, and rivets 12' are passed through this bolt, through the plate 10' and through the intervening parts 7 and 8 as illustrated most clearly in Fig. 4, whereby to rigidly unite all of these parts and to anchor the bolt 13 more effectively than could otherwise be done. The ends of the plate 10' are secured to the adjacent bracket ends 8 by rivets 11'.

Co-operable with the plate 10' in forming a channel-shaped rim seat, is the bent edge 14' of a plate 14 which is opposed to the vertical flange 3 of the bar 1, said plate having an opening 15 to receive the bolt 13 and being laterally bent above and below this opening to provide reinforcing flanges 16 which receive the bar 1 therebetween so as to prevent any possible pivotal movement of the plate 14 upon the bolt 13. An appropriate nut 17 is threaded on the bolt 13 to clamp the plate 14 in place and the outer end of said bolt is preferably provided with an opening 18 to receive the shackle of a padlock 19. This lock prevents removal of the nut 17 and hence prevents theft of the tire and rim carried by the device.

In operation, assuming that a tire and rim are to be applied to the carrier, the plate 14 is removed by first unlocking the padlock 19 and removing the nut 17. This having been done, one side of the rim is seated in the one-piece channel-shaped seat or plate 10 at one end of the bar 1, whereupon the tire and rim are forced onto the plate 10'. The plate 14 is now applied and when the nut 17 is tightened, the rim is effectively clamped in place and as the cam-like bent edges 10'' and 14' of the plates 10' and 14, wedge into the rim, they spring the latter to such an extent as to prevent any possible radial vibration and consequent rattling. In addition to this holding effect, the rim is tightly clamped in place by tightening of the nut 17.

By securing the widened ends 8 of the bracket arms 9 to the inner sides of the channel-shaped rim seats, these seats are effectively reinforced regardless of the fact that they are of unusual height. Furthermore, anchorage of these parts to the ends of the bar 1 in the manner shown and described, forms a very inexpensive and efficient feature of construction, serving also at one end of the bar to anchor the bolt 13 in a much more rigid manner than if it were merely passed through an opening in the flange 3 and provided on its inner end with a head for contact with said flange. Another novel detail is the provision of the flanges 16 which not only stiffen the plate 14 but straddle the bar 1 so as to prevent any possible tilting of the plate 14 upon the bolt 13, when there is no rim applied to the carrier.

The device has been successfully constructed at less expense than a number of similar devices, which is a highly advantageous item, both to the manufacturer and the purchaser. Regardless of this comparatively cheap construction however, the device is sufficiently rigid to meet all requirements.

While I prefer to employ the several details disclosed, it is to be understood that within the scope of the invention as claimed, the device may be embodied in other forms.

I claim:

1. A rim and tire carrier comprising a rigid bar, an arcuate one-piece channel shaped seat carried rigidly by one end of said bar and having relatively immovable side walls flaring outwardly for their entire depth and between which the rim is adapted to be positioned, a substantially semi-channel shaped member rigidly carried by the other end of said bar and adapted to be engaged by the rim after the latter has been positioned in said channel shaped seat, a removable substantially semi-channel shaped member cooperable with and of substantially the same length as the aforesaid member to form therewith a second complete channel-shaped rim seat having side walls flaring outwardly for their entire depth, and means for detachably securing said movable member in operative relation with said rigid member.

2. A rim and tire carrier comprising a pair of curved channel-shaped rim seats having side walls flaring outwardly for their entire depth, one of which is vertically divided into fixed and removable sections, said seats being vertically elongated to provide for substantial contact with the rim to prevent angling of the latter, a pair of attaching brackets having plate-like ends widened vertically and curved for contact throughout their width with the inner sides of said rim seats, a horizontal spacing bar extending between said widened bracket ends and contacting therewith at points between their upper and lower edges, and means securing said seats and said bracket ends together and also securing the latter to the ends of said bar.

3. A rim and tire carrier comprising a rigid bar, a rim seat carried by one end of said bar, a curved plate secured rigidly to the other end of said bar and extending transversely thereof, one end of said plate having a flange to engage the edge of the rim, a second plate having a portion positioned at right angles to the aforesaid plate and contacting with one side of said bar, said second plate having its outer edge bent to co-act with the aforesaid flange for holding the rim, the inner edge of said second plate being laterally bent above and below its intermediate portion to form re-inforcing flanges positioned above and below said bar, and means passing through said intermediate portion of said second plate for detachably securing this plate to said bar.

4. A rim and tire carrier comprising an angle metal bar having a rim seat at one end, one flange of said bar being bent laterally at the other end of the bar, attaching brackets one of which bears against the outer side of said bent flange end, a bolt extending through one flange of said bar and contacting at one end with the inner side of said bent flange end, an arcuate plate contacting with the outer side of said one bracket and having a rim-engaging flange, rivets passing through said bent flange end, said bracket, said bolt and said plate and securing them rigidly together, a removable rim holding plate having an opening receiving said bolt, and a nut threaded on said bolt to hold said removable plate in place.

In testimony whereof I have hereunto set my hand.

ADJUTOR N. AUDET.